(12) United States Patent
Ritchey et al.

(10) Patent No.: US 12,077,023 B2
(45) Date of Patent: Sep. 3, 2024

(54) TRUCK SADDLE-MOUNTS WITH J-CLAMP

(71) Applicant: WHITE MULE COMPANY, Ontario, OH (US)

(72) Inventors: Larry Steven Ritchey, Mansfield, OH (US); Andrew Patrick Ritchey, Mansfield, OH (US)

(73) Assignee: WHITE MULE COMPANY, Ontario, OH (US)

( * ) Notice: Subject to any disclaimer, the term of this patent is extended or adjusted under 35 U.S.C. 154(b) by 925 days.

(21) Appl. No.: 17/130,043

(22) Filed: Dec. 22, 2020

(65) Prior Publication Data
US 2022/0194150 A1  Jun. 23, 2022

(51) Int. Cl.
| | |
|---|---|
| *B60P 3/00* | (2006.01) |
| *B60D 1/14* | (2006.01) |
| *B60P 3/075* | (2006.01) |
| *B60P 3/12* | (2006.01) |

(52) U.S. Cl.
CPC .............. *B60D 1/14* (2013.01); *B60P 3/075* (2013.01); *B60P 3/125* (2013.01)

(58) Field of Classification Search
CPC .......... B60P 3/075; B60P 3/125; B60P 1/127; B60D 1/14; B60D 1/486
USPC ...... 410/9–10, 19–22, 24, 58; 280/402, 503, 280/495
See application file for complete search history.

(56) References Cited

U.S. PATENT DOCUMENTS

| | | | | |
|---|---|---|---|---|
| 1,548,672 | A | * 8/1925 | Evans | B60P 3/075 410/22 |
| 1,711,089 | A | * 4/1929 | Evans | B60P 3/075 410/22 |
| 1,828,145 | A | * 10/1931 | Clarence | B60P 3/075 410/9 |
| 5,722,677 | A | 3/1998 | Lichter et al. | |

* cited by examiner

*Primary Examiner* — Stephen T Gordon
(74) *Attorney, Agent, or Firm* — Jacob M. Ward; Ward Law Office LLC (57) ABSTRACT

A saddle-mount has a bolster configured to be disposed on a towing vehicle. A head assembly has at least one clamp assembly configured to receive a vehicle to be towed. The head assembly has a socket formed in a bottom surface, and a ball disposed in the socket. The ball is further disposed on the bolster, whereby the head assembly is permitted to freely pivot in any direction about the ball. The clamp assembly has a J-clamp, a rocker portion, and a straight bolt. The J-clamp is slidably disposed in the rocker portion and selectively secured to the rocker by the straight bolt. The straight bolt disposed through the rocker and threaded with the J-clamp, whereby a position of the J-clamp relative to the rocker is controlled by a rotation of the straight bolt.

20 Claims, 9 Drawing Sheets

TRUCK SADDLE-MOUNTS WITH J-CLAMP

FIELD

The present disclosure relates generally to devices for the transportation of vehicles and, more particularly, to an improved saddle-mount configuration for coupling multiple vehicles together for transport.

BACKGROUND

Devices for coupling vehicles together for purposes of either towing a disabled vehicle or for shuttling vehicles between multiple locations are well known. Conventionally, a saddle-mount, is designed to couple a lead vehicle to a towed vehicle or combination of vehicles.

In truck applications, the saddle-mount is conventionally mounted to either the fifth wheel, or to the frame of the lead truck. The saddle-mount is then generally coupled to the front axle of the towed vehicle, such that the front axle of the towed vehicle is lifted from the ground, and the towed truck rolls on the rear wheels only. Alternatively, multiple saddle-mounts can be used in any combination to attach additional trucks. Up to three saddle-mounts may be used to transport a maximum of four trucks in total.

Other saddle-mount designs include the use of a "Rocker" and "J-Bolt" assembly. J-Bolts do not accommodate all vehicle axle sizes. Ill-fitting axles may cause undue stress on the J-Bolts during operation. Further, J-Bolts are the weak link in a saddle-mount that limit the clamping force of the "Rocker" and "J-Bolt" assembly.

Conventional saddle-mount configurations generally include a saddle bolster (the lower half of a saddle-mount) that is used to secure the saddle-mount to either the frame or fifth wheel of the towing or lead vehicle and a saddle head (the upper half of a saddle-mount) for securing and retaining the front axle of the vehicle being towed.

There is a continuing need for a saddle-mount that can accommodate the varying sizes of all vehicle axles as well as provide greater clamping force on the axle.

SUMMARY

In concordance with the instant disclosure, a saddle-mount that can accommodate varying sizes of all vehicle axles, and which provides a greater clamping force on the axle, has been surprisingly discovered.

In one embodiment, a saddle-mount has a bolster configured to be disposed on a towing vehicle. A head assembly with a base that is disposed on the bolster, and at least one clamp assembly, which is pivotably connected to the base. The clamp assembly is configured to connect to a vehicle to be towed. The clamp assembly has a J-clamp, a rocker, and a straight bolt. The J-clamp is slidably disposed in the rocker and selectively secured to the rocker by the straight bolt. The straight bolt is disposed through the rocker, whereby a position of the J-clamp relative to the rocker is controlled by a rotation of the straight bolt.

In another embodiment, a saddle-mount has a bolster configured to be disposed on a towing vehicle. A ball is disposed on the bolster. A head assembly has at least one clamp assembly. The clamp assembly is configured to receive a vehicle to be towed. The head assembly has a socket formed in a bottom surface, and the ball is disposed in the socket. The head assembly is permitted to freely pivot in any direction about the ball.

In another embodiment, a saddle-mount has a bolster configured to be disposed on a towing vehicle. A ball is disposed on the bolster. A head assembly has at least one clamp assembly configured to receive a vehicle to be towed. The head assembly has a socket formed in a bottom surface, and the ball disposed in the socket, whereby the head assembly is permitted to freely pivot in any direction about the ball. The clamp assembly has a J-clamp, a rocker, and a straight bolt. The J-clamp is slidably disposed in the rocker and selectively secured to the rocker by the straight bolt. The straight bolt disposed through the rocker, whereby a position of the J-clamp relative to the rocker is controlled by a rotation of the straight bolt.

In an exemplary embodiment, a saddle-mount includes a new head assembly or "upper half" of the saddle-mount with two (2) new rockers and mating J-clamps with custom high strength bolts. The two (2) new rockers and mating J-clamps replace the rocker and J-bolt design that is currently used to attach the saddle-mount head or "upper half" of the saddle-mount to the I-beam front axle of the truck being decked.

The weakest parts of known saddle-mounts are the J-Bolts. The new rocker and mating J-clamp design eliminates the J-bolts and is, therefore, significantly stronger than the current design. Preliminary data indicates that this new design could allow for an increase in clamping force of more than 300%. This is a large increase over the known saddle-mounts that will result in much improved clamping of the I-beam front axle.

This saddle-mount features many unique elements. Namely, a new head assembly that incorporates a new rocker and mating J-clamp assembly that is used to clamp the new head assembly of the saddle-mount to the I-beam front axle of the truck being decked. This new head assembly uses (2) new J-clamps and straight bolts instead of (2) J-bolts to clamp the front axle. It should also be noted that the J-bolts are the weak link in current saddle-mount designs.

These new elements can be used in virtually all saddle-mount types. They can be used in frame style saddle-mounts, fifth wheel style saddle-mounts, and combination saddle-mounts. This new rocker, mating J-clamp and head assembly can be used to replace the rocker, J-bolt, and head assemblies used in nearly all known saddle-mounts.

The clamping profiles of the rocker and mating J-clamp have been redesigned to fit the entire range of I-beam front axles from large to small. The known saddle-mounts do not fit all I-beam front axles. The bottom flanges on some heavy duty I-beam front axles are too big to fit the known saddle-mounts. The axles do not seat properly down inside the J-hooks of the rockers and J-bolts. This creates additional stress on the rockers and J-bolts.

On the other hand, some of the light-weight I-beam front axles are too small and do not fit properly either. The I-beam actually sits on the J-bolt adding extra stress from the weight of the truck, as well as the stress created by the vibration and pounding from the trucks as they travel over the road, especially on rough roads and roads with potholes.

The new rocker and J-clamp assemblies interlock in such a way that provides additional lateral stability by preventing the J-clamp from rotating inside the rocker assembly. This additional lateral stability improves clamping performance which helps to prevent the I-beam axle from sliding sideways inside the rocker and J-clamp assemblies of the saddle-mount.

The new rocker and J-clamp also interlock in such a way that eliminates any bending torque on the bolts that are used to clamp the I-beam front axle. Therefore, the only force on the bolts is the tension from clamping the I-beam front axle.

The new rocker and J-clamp assemblies are designed in such a way that lets the J-clamp rotate out of the way when the J-clamp is loosened, making it easier to deck and un-deck the trucks.

The new J-clamp can feature internal threads that eliminate the nut that is presently used with known saddle-mounts. This conceals and protects the bolt threads as well as providing additional clearance between the head assembly and the oil pans on the trucks being decked. This additional clearance is achieved because the bolt is now concealed inside the J-clamp instead of sticking out as is currently the case on known saddle-mounts.

In another exemplary embodiment, the saddle-mount features a unique head assembly that incorporates a ball and socket joint to connect the head of the saddle-mount to the bolster of the saddle-mount. The ball and socket joint allows the head to swivel freely around the ball in all directions. This head assembly also features two (2) mating J-clamps and custom high strength bolts as previously described hereinabove. This new ball and socket style head assembly can be used with virtually all bolster types. It can be used with frame style bolsters, fifth wheel style bolsters, and combination style bolsters.

The ball and socket joint solves a problem that exists with known saddle-mounts. This problem has to do with the fact that the saddle-mount head, when installed on a "decked" truck, will rotate in one plane and the "decked" truck will rotate in a different plane. This difference results in a twisting action that is trying to twist the saddle-mount apart.

In other words, a "decked" truck will rotate around the truck that it is attached to in a plane parallel with the road surface. The saddle-mount on the other hand in the case of a fifth wheel saddle will rotate in a plane that is parallel with the surface of the fifth wheel on which the saddle-mount is mounted. In the case of a frame style saddle-mount, the head assembly will rotate in a plane that is parallel with the frame of the truck that the saddle-mount is mounted to. The only time when these planes are parallel with each other is when the fifth wheel or frame is parallel with the road surface. This only happens on the lead truck because it is the only truck that is sitting flat on the ground. All of the remaining trucks are "decked," which forces their frame and fifth wheel to be in a plane that is not parallel with the road surface.

This twisting action is magnified when the angle of the decked truck increases and when the turning radius gets tighter. This twisting action can become very significant especially if the decked trucks become jackknifed, which can easily happen if the decked trucks are backed up. For the most part, these forces are absorbed by the suspensions of both trucks. However, there is no way of knowing when these forces become so great that they damage the saddle-mount and/or the trucks.

This saddle-mount with a ball and socket joint will allow the saddle-mount head to swivel freely in all directions around the ball and virtually eliminate these forces thereby reducing the stress on the saddle-mounts and the trucks they are attached to.

The saddle-mount features an optional pair of safety chains that are incorporated into the head assembly. This is also a new feature that has never been incorporated into the design of any saddle-mount. The safety chains add an additional level of security in the unlikely event that the saddle-mount would become separated from the I-beam front axle of the decked truck. This feature could be incorporated in all current saddle-mount designs by attaching safety chain lugs to the saddle-mount head or to the bolster.

The head assembly is configured in such a way that when it is installed it is virtually impossible for the head and ball joint to come apart during operation. This is due to the fact that the ball is installed from the top with the ball cap also installed and tightened from the top. When installed on the I-beam front axle, the ball cap is trapped and cannot come out because it would hit the bottom side of the I-beam axle.

The head assembly also utilizes a "ball cap lock plate" to lock the ball cap in place by preventing it from rotating or unthreading. This lock plate makes it impossible for the ball cap to come loose. The lock plate has a unique notch design that allows for a very fine tightening adjustment of the ball cap. The ball cap can be tightened and locked in place every 30 degrees. This equates to a tightening adjustment of 0.0104". The tightening adjustment can be easily modified by changing the thread pitch on the ball cap or by changing the number of notches on the ball cap lock plate.

The head assembly has a unique swivel stop or limit built in that keeps the head assembly from swiveling too far and binding against the neck of the ball. This eliminates any additional torque that would result if the head assembly were permitted to bind against the neck of the ball.

The angle of the head and J-clamp assembly has been designed to optimize the range of movement needed in order to accommodate the wide variety of configurations found on the unlimited number of combinations of decked trucks. The angle of the head assembly relative to the bolster changes and is different with every combination of decked trucks. It is, therefore, very important to optimize the range of movement in order to accommodate all combinations of decked trucks. In other words, as a non-limiting example, by rotating the bottom opening of the socket forward 10 degrees it increases the available backward rotation by 10 degrees.

There can be one (1) lubrication point in the embodiment with a ball and socket joint making it easier to lubricate. An O-ring is utilized inside the head assembly for the following purposes: it provides a seal for the lubricant; it keeps dirt and other foreign matter out of the ball and socket joint.

Additionally, during assembly, the O-ring is compressed against the ball, which helps to stabilize the head assembly and keep it in an upright position during the decking process. It also helps to keep the head assembly from swiveling too freely during the decking process.

A hex top was added to the fifth wheel pin on combination saddle-mounts to lock the fifth wheel pin into the bolster of the saddle-mount, so they rotate together and do not transfer any rotational torque to the king pin, which also secures the ball to the bolster. This hex top also holds the fifth wheel pin during the assembly process making it easier to torque the ball down.

The fifth wheel pin on the low fifth wheel saddle-mount was designed with a threaded hole to attach the new ball directly to the fifth wheel pin. This was done in order to minimize the overall height of the saddle-mount. Maintaining the lowest possible overall height of the saddle-mount is sometimes critical when attempting to keep the overall height of the decked trucks below the DOT height restrictions.

An alternative saddle-mount design incorporates a ball & spring and detent inside the head assembly that would hold the head in an upright position during installation. It would also let the head rotate in order to align and mate with the I-beam front axle when the truck is being decked. During operation, the ball is forced down out of the way by compressing the spring, thereby allowing the head to swivel freely in all directions.

DRAWINGS

The above, as well as other advantages of the present disclosure will become readily apparent to those skilled in the art from the following detailed description, particularly when considered in the light of the drawings described hereafter.

DETAILED DESCRIPTION

The following description is merely exemplary in nature and is not intended to limit the present disclosure, application, or uses. It should be understood that throughout the drawings, corresponding reference numerals indicate like or corresponding parts and features. In respect of the methods disclosed, the order of the steps presented is exemplary in nature, and thus, is not necessary or critical unless otherwise disclosed.

As shown in FIGS. 1-13, a saddle-mount 100, according to various embodiments of the present disclosure, is shown. The saddle-mount 100 is configured to allow a vehicle to be towed to be connected with a towing vehicle. As a non-limiting example, The saddle-mount 100 may include a saddle-mount bolster 101, which is configured to be disposed on the towing vehicle. A head assembly 102 may be disposed on the bolster 101. The head assembly 102 is configured to receive the vehicle to be towed.

Figure 17:
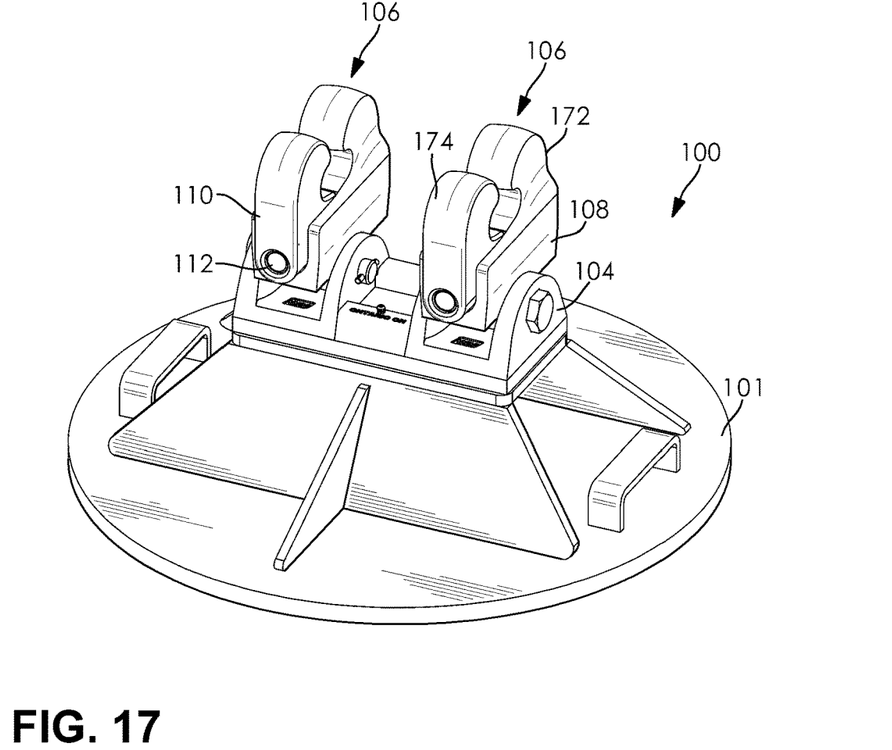
FIG. 17 is a top perspective view of another embodiment of a saddle-mount with the head shown in FIG. 2, further depicted attached to a fifth wheel saddle bolster.
Figure 18:
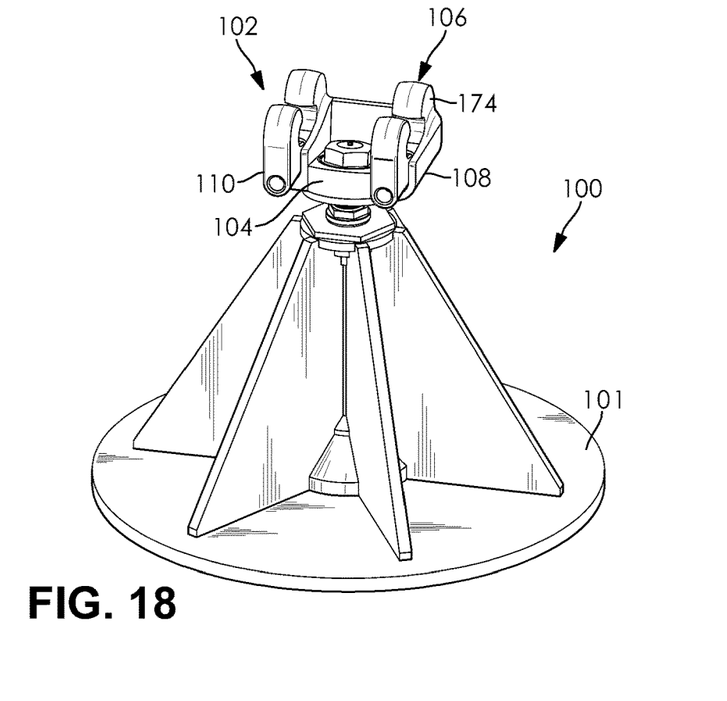
FIG. 18 is a top perspective view of another embodiment of a saddle-mount with the head assembly attached to a fifth wheel saddle bolster with a ball and socket connection.

It should be appreciated that the head assembly 102 of the present disclosure may be utilized with a variety of bolsters 101. As non-limiting examples, suitable bolsters 101 include frame style, fifth wheel style and combination style bolsters 101. For example, FIGS. 17-18, illustrate saddle-mounts 100 according to various embodiments of the present disclosure in use with fifth wheel style bolsters 101. With reference to FIG. 17, the head assembly may be welded to the bolster 101. The head assembly 102 may also be bolted to the bolster 101. A skilled artisan may select other suitable bolsters 101 and methods of attachment, as desired.

With reference to FIGS. 1-9, in certain embodiments, the head assembly 102 may have a head 104. The head 104 may be disposed on the bolster 101. The head 104 may have at least one clamp assembly 106 disposed thereon. The clamp assembly 106 may be pivotably attached to the head 104 by a rocker pin 107. As one non-limiting example. The clamp assembly 106 may receive an axle of the vehicle to be towed, in operation. In a more particular embodiment, the head assembly 102 may have a plurality of clamp assemblies 106. As a non-limiting example, the head assembly 102 may have two clamp assemblies 106.

The clamp assembly 106 may have a rocker 108, a J-clamp 110, and a straight bolt 112. The J-clamp 110 may be slidably disposed in the rocker 108. The straight bolt 112 may selectively secure the J-clamp 110 to the rocker 108. More specifically, the straight bolt 112 may be disposed through the rocker 108 and can be threaded with the J-clamp 110. Additionally, the J-clamp 110 can be secured to the rocker via a bolt and a nut instead of the threaded connection. It should be appreciated that a position of the J-clamp 110 relative to the rocker 108 is controlled by a rotation of the straight bolt 112.

The rocker 108 may have a rocker body 114. The rocker body 114 may have a projection 116 formed in a bottom surface thereof. The projection 116 may be semicircular in shape. The projection 116 may be disposed in the head 104 by means of the rocker pin 107. In operation, the rocker body 114 may rotate about the rocker pin 107. Advantageously, the rotation of the rocker body 114 may militate against torque in the clamp assembly 106, in operation.

The rocker body 114 may have a first bore 118 formed therein. The first bore 118 may have a circular cross-section. The first bore 118 may have a first major surface 120. The rocker 108 may have a channel 122 formed in an upper surface of the rocker body 114. The channel 122 may be disposed adjacent to the first bore 118. The channel 122 may have a U-shaped cross-section. A skilled artisan may select other suitable shapes for each of the first bore 118 and the channel 122.

With continued reference to FIGS. 1-9, the J-clamp 110 may have a J-clamp body 124. The J-clamp body 124 may have a block portion 126 and a hollow cylindrical portion 128. The J-clamp body 124 may have a second major interior surface 130, which defines a second bore 132 disposed through the hollow cylindrical portion 128 and at least part of the block portion 126. The hollow cylindrical portion 128 may have a second major exterior surface 134. The hollow cylindrical portion 128 may be disposed below the block portion 126 on the J-clamp body 124.

Figure 1:
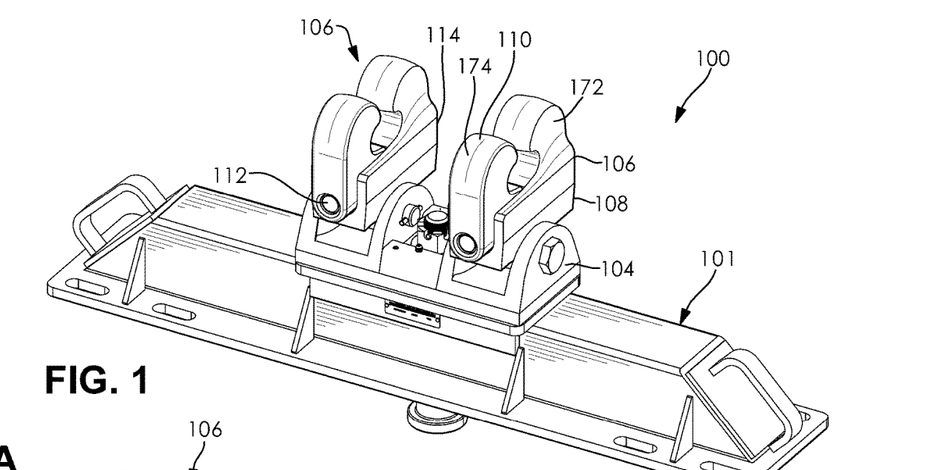
FIG. 1 is a top perspective view of a saddle-mount, according to one embodiment of the present disclosure.
Figure 2:
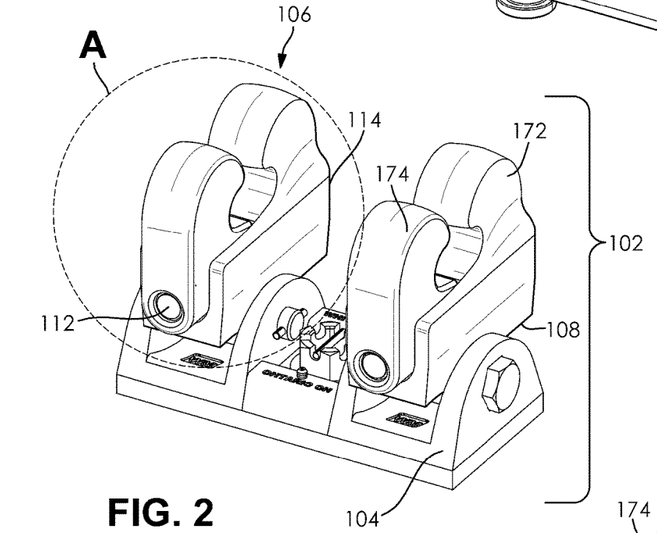
FIG. 2 is a top perspective view of a head assembly of the saddle-mount of FIG. 1, further depicting the head assembly removed from a bolster.
Figure 3:
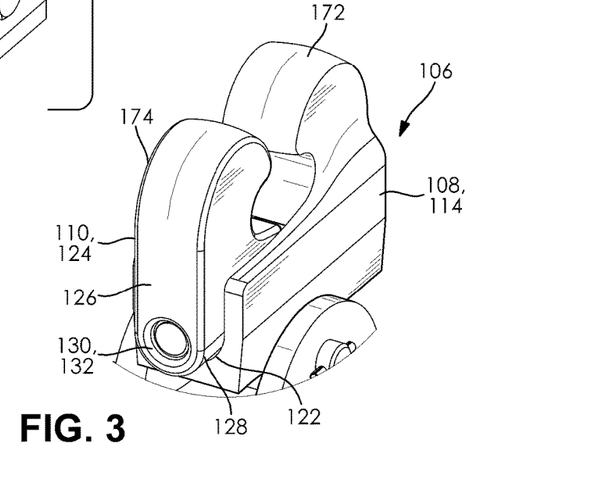
FIG. 3 is an enlarged top perspective view of a clamp assembly of the saddle-mount taken at callout A in FIG. 2.
Figure 4:
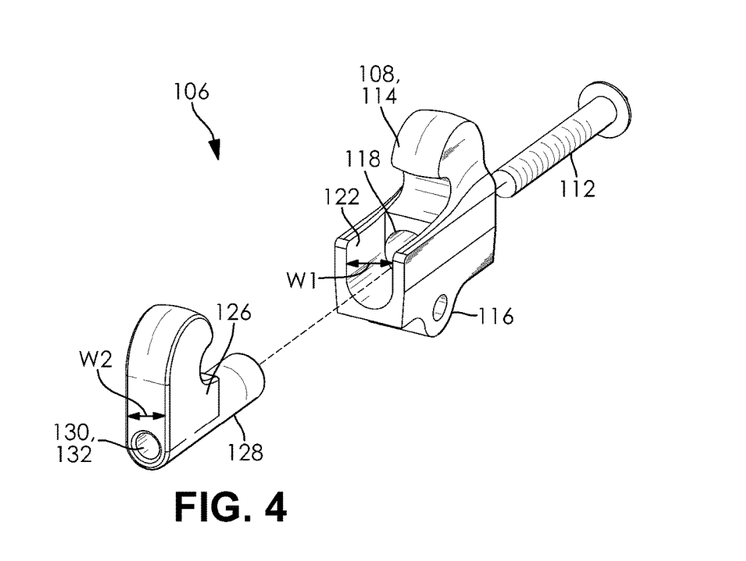
FIG. 4 is an enlarged, exploded view of the clamp assembly of FIG. 2.
Figure 5:
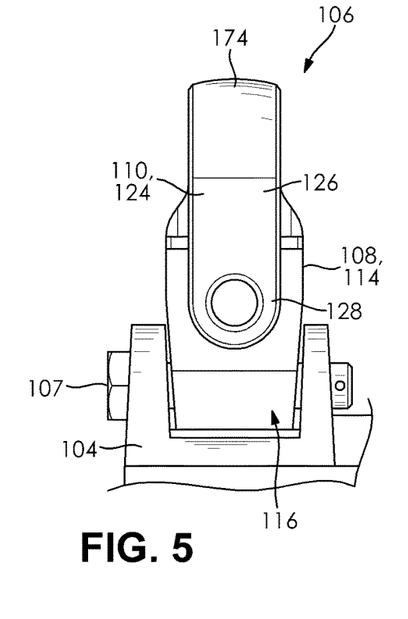
FIG. 5 is a rear elevational view of the clamp assembly shown in FIG. 2.
Figure 6:
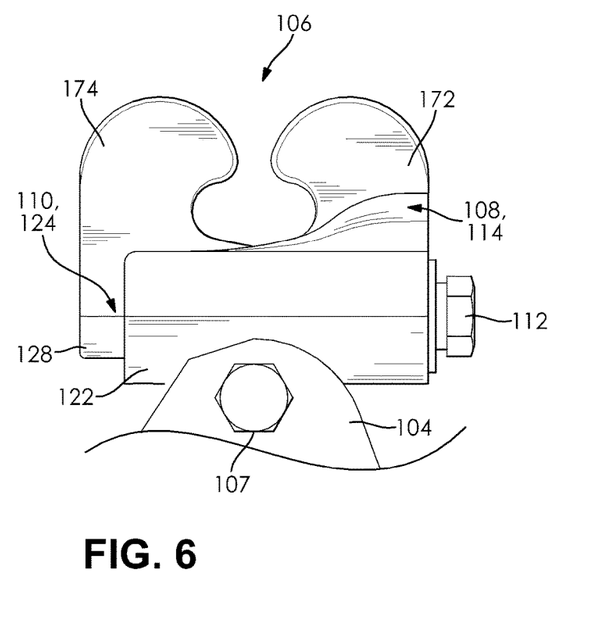
FIG. 6 is a side elevational view of the clamp assembly of FIG. 2.
Figure 7:
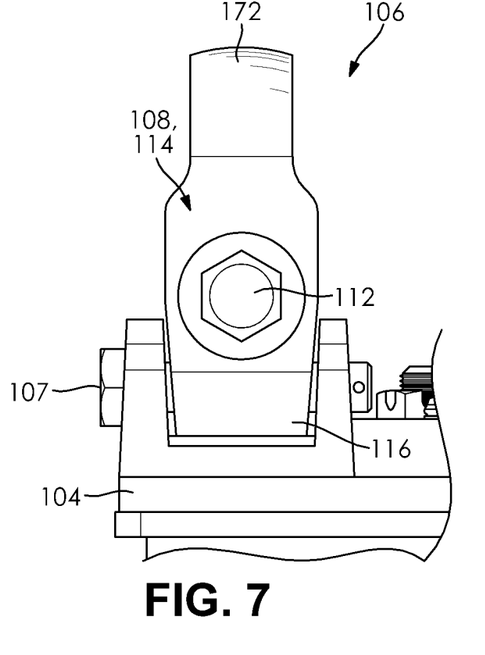
FIG. 7 is a front elevational view of the clamp assembly shown in FIG. 2.
Figure 8:
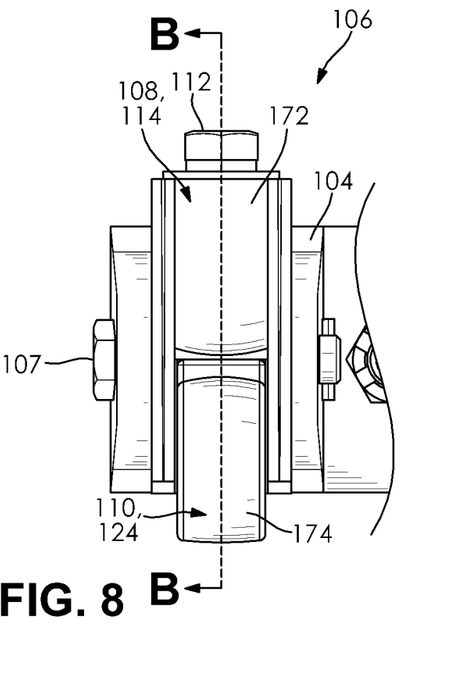
FIG. 8 is a top plan view of the clamp assembly of FIG. 2.

As shown in FIGS. 2-4, the block portion 126 of the J-clamp body 124 may be slidably disposed in the channel 122 of the rocker body 114, and the hollow cylindrical portion 128 of the J-clamp body 124 may be slidably disposed in the first bore 118 of the rocker body 114. An interlocking of the rocker 108 and the J-clamp 110 is permitted by particular dimensions of the rocker 108 and the J-clamp 110, which are discussed in further detail hereinbelow.

Figure 9:
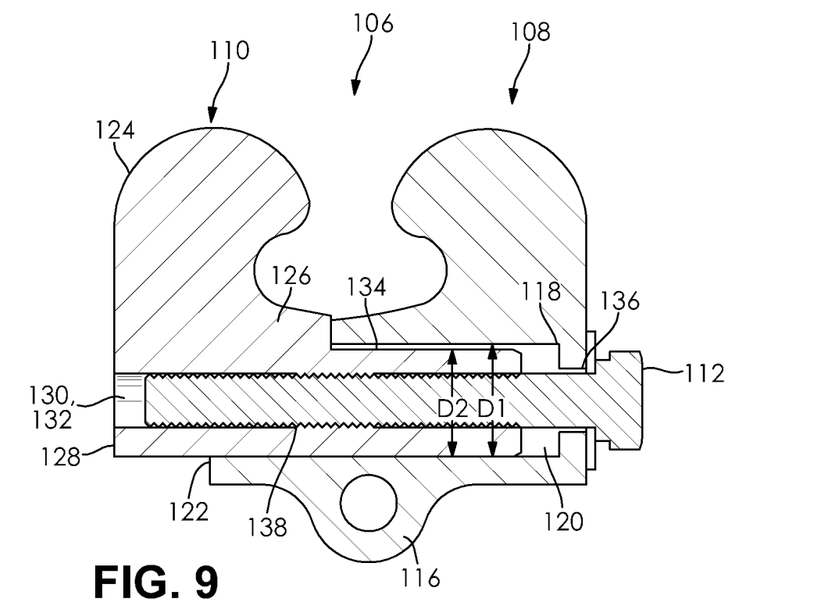
FIG. 9 is a cross sectional side elevational view of the clamp assembly taken at section line B-B in FIG. 8, further depicting the clamp assembly removed from a head.
Figure 10:
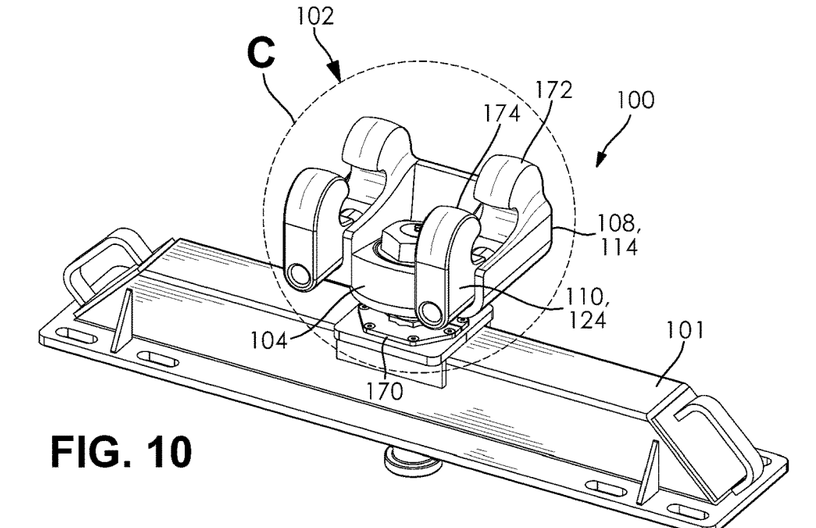
FIG. 10 is a top perspective view of a saddle-mount, according to another embodiment of the present disclosure, further depicting a head assembly that is connected to a bolster by a ball and a socket style connection.

As shown in FIG. 9, the first bore 118 of the rocker body 114 may have a first diameter (D1). The hollow cylindrical portion 128 of the J-clamp body 124 may have a second diameter (D2). The first diameter (D1) may be greater than the second diameter (D2). It should be appreciated that this permits the hollow cylindrical portion 128 of the J-clamp body 124 to be slidably received by the first bore 118 of the rocker body 114. It should be appreciated that suitable dimensions for the first bore 118 and the hollow cylindrical portion 128 may be chosen by a skilled artisan within the scope of the present disclosure.

In reference to FIG. 4, the channel 122 of the rocker body 114 has a first width (W1). The block portion 126 of the J-clamp body 124 has a second width (W2). The first width (W1) is greater than the second width (W2). Advantageously, this permits the block portion 126 of the J-clamp body 124 to be slidably received by the channel 122 of the rocker body 114. A skilled artisan may select suitable dimensions for the channel 122 and the block portion 126, as desired.

It should be further appreciated that first width (W1) and the U-shaped cross-section of the channel 122 militates against a rotation of the J-clamp body 124 where disposed in the channel 122 of the rocker body 114. It should be appreciated that militating against the rotation of the J-clamp body 124 will result in a more stable and secure connection to the I-Beam front axle.

In operation, a clamping force between the J-clamp 110 and the rocker 108 will create a bending torque. This bending torque is absorbed by the rocker and J-clamp due to the fact that the cylindrical portion 128 of the J-clamp 110 is disposed inside the first bore 118 of the rocker. Advantageously, this allows only a tension force on the straight bolt 112. Thus, the straight bolt 112 can withstand more tension before permanent deformation compared to the J-bolts that are utilized in known saddle-mounts.

Where the hollow cylindrical portion 128 is disposed in the channel 122, the J-clamp body 124 may be permitted to rotate. In particular, the J-clamp body 124 may rotate inside the first bore 118 and the channel 122 providing additional clearance to dispose the front axle of a decked truck onto rocker 108. Advantageously, the rotation of the J-clamp body 124 may allow for additional clearance when loading and unloading the axle of the vehicle to be towed, and thus, make the saddle-mount 100 easier to use.

The rocker body 114 has an opening 136 formed in a first end of the rocker body 114. The opening 136 is in communication with the first bore 118. The straight bolt 112 may be disposed through the opening 136 at the first end of the rocker body 114. Where the J-clamp 110 is disposed through the rocker 108, the straight bolt 112 is likewise disposed through the first bore 118 of the rocker body 114, and in the second bore 132 of the J-clamp body 124.

With reference to FIG. 9, the second major interior surface 130 of the hollow cylindrical portion 128 of the J-clamp body 124 has an unthreaded segment and a threaded segment 138. The unthreaded segment has a first length and the threaded segment 138 has a second length. The second length is less than the first length. In other words, the threaded segment 138 is shorter than the unthreaded segment. As a non-limiting example, the second length may be from 0.5 inches to 5 inches. More particularly, the second length may be from 1 inch to 3 inches. Advantageously, the threaded segment 138 may cooperate with the straight bolt 112 to selectively secure the J-clamp 110 to the rocker 108. Other suitable dimensions for the threaded segment 138 may be selected by a skilled artisan, as desired.

In certain embodiments, for example, as shown in FIGS. 10-16, the head 104 and the rocker 108 may be coformed into a single unit. The single unit may, therefore, define the head assembly 102. In particular non-limiting examples, the head assembly 102 may include two rockers 108 coformed with the head 104. The head assembly may be connected to the bolster 101 via a ball 140 and a socket 142. In particular, the socket 142 may be formed in a bottom surface of the head assembly 102. The ball 140 may be disposed in the socket 142, and on the bolster 101. Accordingly, the ball 140 and socket 142 allow the head assembly 102 to freely pivot in any direction about the ball 140. Advantageously, the ball 140 and the socket 142 militate against undesirable twisting torque between the saddle-mount 100 and the vehicle being towed, in operation.

Figures 11, 12:
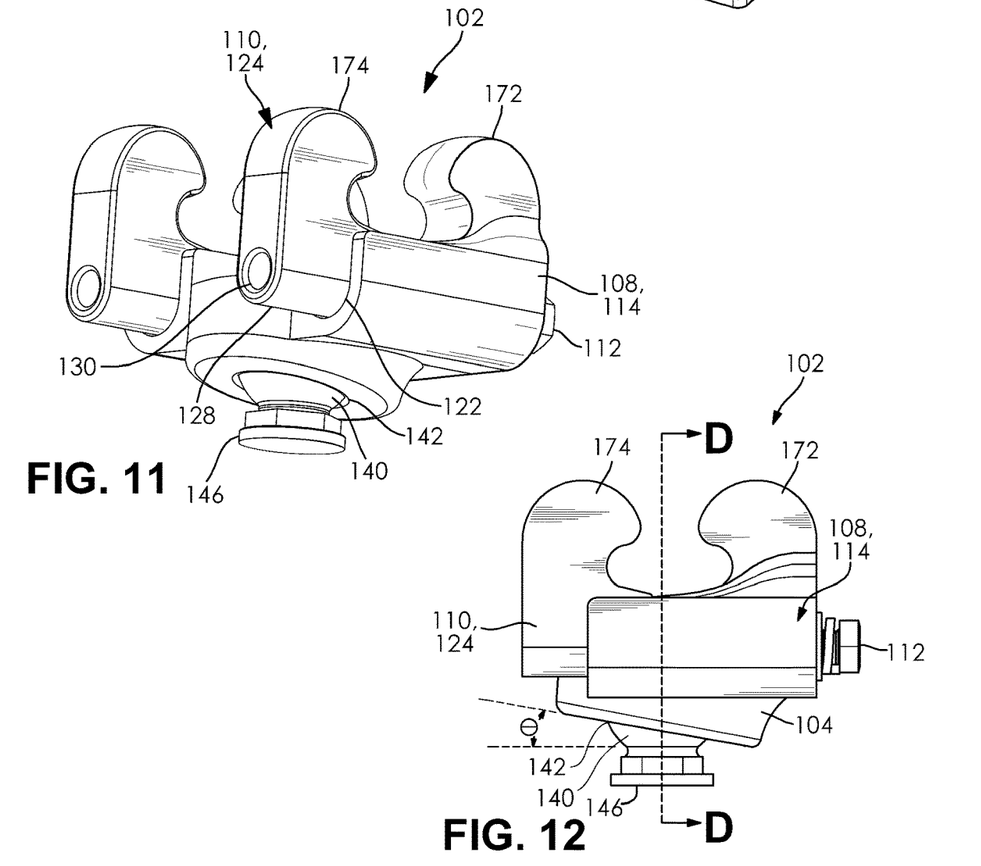
FIG. 11 is an enlarged rear perspective view of a head assembly of the saddle-mount taken at callout C in FIG. 10, further depicting a head assembly with the ball installed and removed from a bolster.
FIG. 12 is a side elevational view of the head assembly shown in FIG. 10 with a ball installed.

As shown in FIG. 12, the socket 142 is disposed at an angle (e) relative to the bolster 101. The angle (e) is configured to optimize a range of movement of the head assembly 102 about the ball 140. It should be appreciated that the saddle-mount 100 may be utilized on trucks of varying sizes. Accordingly, relative angles between the saddle-mount 100 and the towing vehicle will change on a case by case basis. Thus, it is of particular importance to optimize the range of movement of the head assembly 102 with the angle (e) so that the varying sizes of the towing vehicles can be accommodated.

In certain embodiments, the angle (e) may be between about 0 degrees and about 20 degrees. More particularly, the angle (e) may be between about 5 degrees and about 15 degrees. Most particularly, the angle (e) may be about 10 degrees. A skilled artisan may select other suitable angles, as desired.

Figure 14:
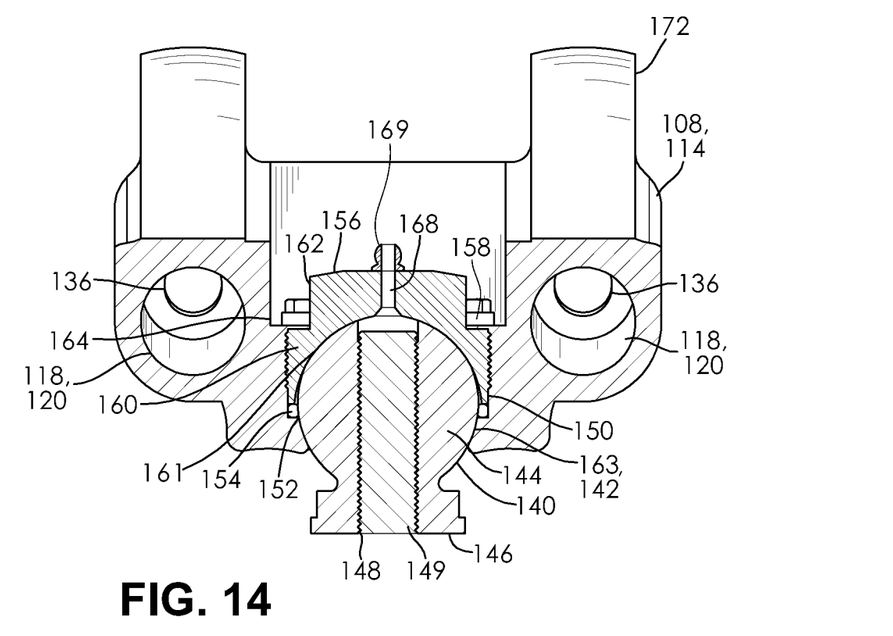
FIG. 14 is a cross sectional rear elevational view of the head assembly taken at section like D-D in FIG. 12.

With reference to FIG. 14, the ball 140 may have an upper portion 144, an attachment portion 146, and a threaded bore 148. The upper portion 144 of the ball 140 is disposed in the head assembly 102. The attachment portion 146 of the ball 140 is disposed on the bolster 101. The threaded bore 148 may receive a first end of a king pin 149. A second end of the king pin 149 may be disposed in the bolster 101. The king pin 149 may be threaded, and cooperate with the threads of the threaded bore 148. The king pin can also be a bolt that passes through a sleeved hole in the bolster 101.

In one embodiment, the socket 142 may be formed through the head 104. The socket 142 may be formed in a substantially central location and disposed between a pair of the rockers 108. The socket 142 may be defined by an interior wall 150, which is described in further detail hereinbelow. The interior wall 150 may have a ledge 152 formed therein, for example, as shown in FIG. 14. An O-ring 154 may be disposed on the ledge 152. The O-ring 154 may form a friction or a press fit with the upper portion 144 of the ball 140. Advantageously, the O-ring 154 stabilizes the ball 140 in the socket 142.

It should be appreciated that the O-ring 154 may provide further advantages to the saddle-mount 100. In particular, the O-ring 154 may provide an internal seal within the socket 142. The internal seal of the O-ring 154 may militate against debris from entering the socket 142. The internal seal may further seal lubricant, which is discussed in greater detail hereinbelow, within the socket 142.

The upper portion 144 of the ball 140 may be secured to the head 104 with a ball cap 156 and at least one ball cap locking plate 158. The ball cap 156 may have a threaded portion 160 and a top portion 162. The threaded portion 160 may be disposed in the head 104, and the top portion 162 may extend outwardly from an upper surface 164 of the head 104.

With continued reference to FIG. 14, the threaded portion 160 of the ball cap 156 may be disposed on top of the upper portion 144 of the ball 140. In particular, the threaded portion 160 may extend into the head 104, and be disposed adjacent to the O-ring 154. The threaded portion 160 may cooperate with threads formed on the interior wall 150 of the head 104.

It should be appreciated that the socket 142 may be defined by an interior surface 161 of the ball cap 156 and a lower interior surface 163 of the head 104, for example, as shown in FIG. 14. These surfaces 161, 163 may work cooperatively to secure the ball 140 within the head 104.

The ball cap 156 may be further secured via at least one ball cap locking plate 158. In certain embodiments, the top portion 162 of the ball cap 156 may be hexagonal in shape, as a non-limiting example. The ball cap locking plate 158 may be notched to receive the corners of the top portion 162 of the ball cap 156. The ball cap locking plate 158 may be affixed to the upper surface 164 of the head 104 with at least one mechanical fastener. Accordingly, the notch of the cap locking plate 158 may secure the corner of the top portion 162 of the ball cap 156, and thereby, militate against the undesirable rotation of the ball cap 156. It should be further appreciated that the ball cap locking plate 158 may allow for minute adjustments to a tightening of the ball cap 156. A skilled artisan may utilize acceptable mechanical fasteners to secure the ball cap 156 to the upper surface 164 of the head assembly 102 within the scope of the present disclosure.

Figure 13:
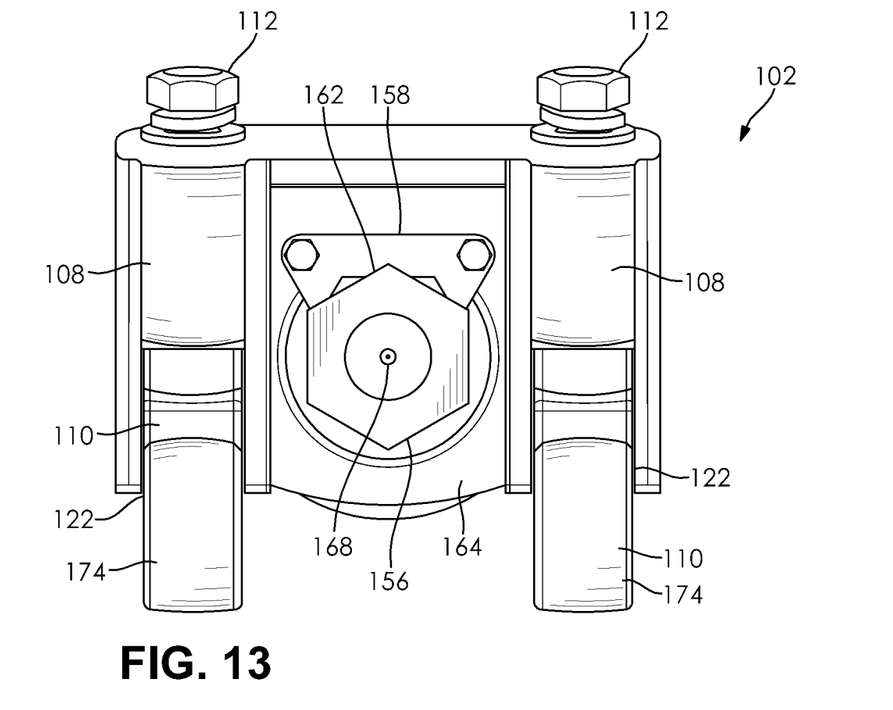
FIG. 13 is a top plan view of the head assembly shown in FIG. 10.

With continued reference to FIGS. 13-14, the top portion 162 of the ball cap 156 may have a lubrication aperture 168 formed therein. The lubrication aperture 168 may further include a grease fitting 169. The lubrication aperture 168 may be configured to direct lubricant to the ball 140 without removal of the cap 156. Advantageously, the use of a single lubrication aperture 168 may provide a simple and efficient method of lubricating the ball 140.

A ball locking plate 170 may militate against the ball 140 from unthreading and loosening up. The ball locking plate 170 may be attached to the bolster 101 using mechanical fasteners, such as screws, as a non-limiting example. A skilled artisan may use other suitable fasteners to connect the ball locking plate 170 to the bolster 101, as desired.

Figure 15:
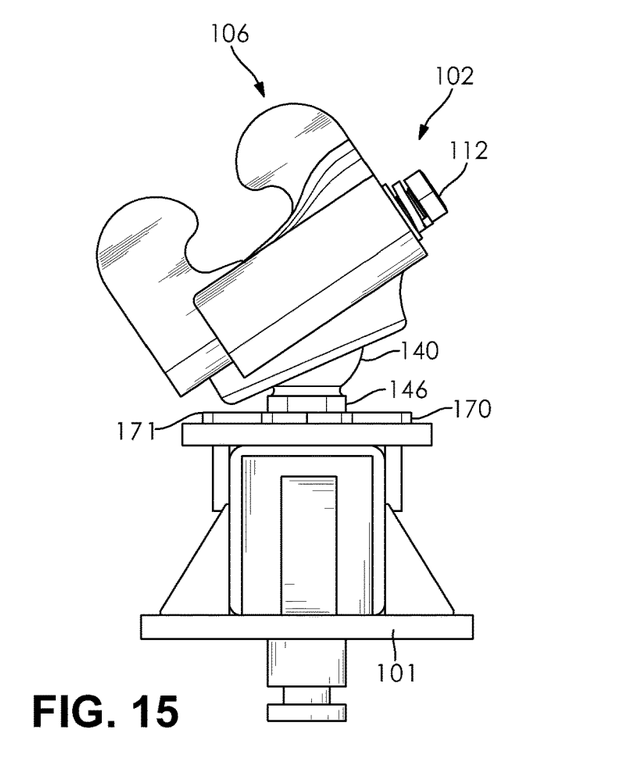
FIG. 15 is a side elevational view of the saddle-mount shown in FIG. 10, further depicting a swivel stop of the head assembly.

It should be appreciated that the head 104 may have a swivel stop 171 formed therein. The swivel stop 171 may be defined by a curve in an exterior surface of the head. In operation, and as shown in FIG. 15, the swivel stop 171 may interact with the ball locking plate 170. The interaction between the swivel stop 171 and the ball locking plate 170 may militate against the head 104 from an over rotation, which may lead to the head 104 binding at a neck of the ball 140. The swivel stop 171 of the head 104 may instead contact the ball locking plate 170 preventing the head 104 from rotating further and binding against the neck of the ball 140. Thus, the head 104 is configured to militate against an undesirable over rotation of the head 104 about the ball 140.

Figure 16:
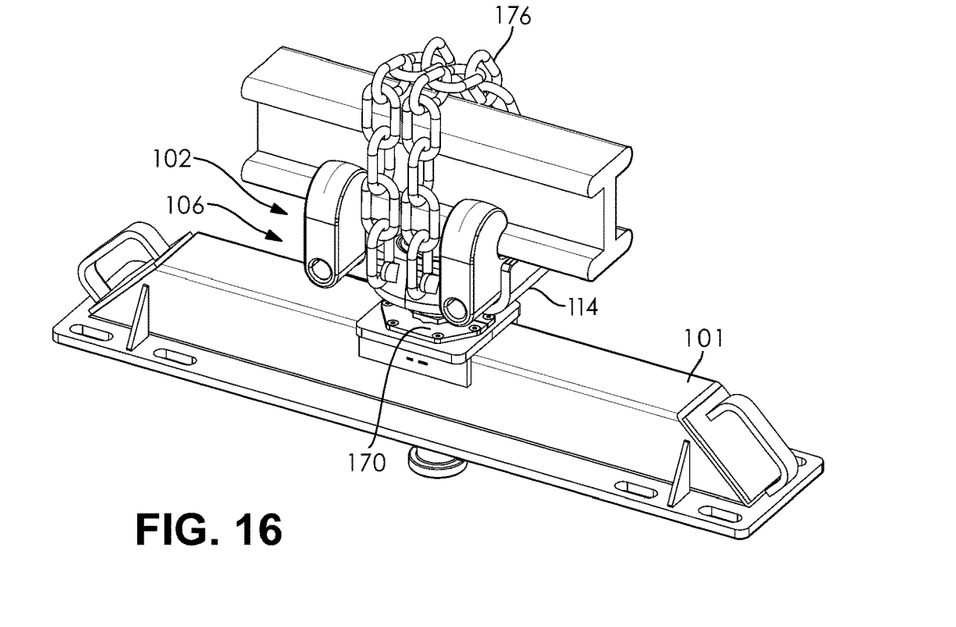
FIG. 16 is a top perspective view of the saddle-mount of FIG. 10, further depicting optional safety chains.

With renewed reference to FIGS. 1-18, the rocker body 114 has a first hook portion 172, and the J-clamp body 124 has a second hook portion 174. The first hook portion 172 may be disposed opposite and facing the second hook portion 174. The first hook portion 172 and the second hook portion 174 are configured to receive an axle of the vehicle to be towed therebetween. In certain embodiments, for example as shown in FIG. 16, safety chains 176 may also be used to provide further security to the axle where disposed between the first hook portion 172 and the second hook portion 174.

Figure 19:
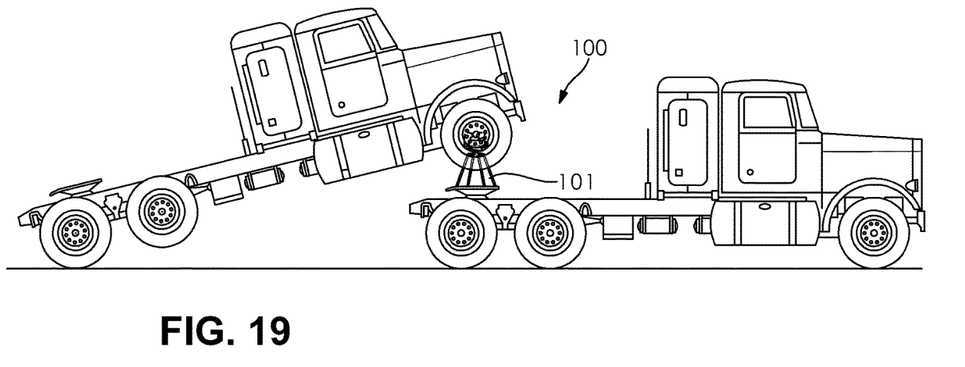
FIG. 19 is a side elevational view of the saddle-mount of FIG. 18, further depicting a method of towing a vehicle, according to a further embodiment of the present disclosure.
Figure 20:
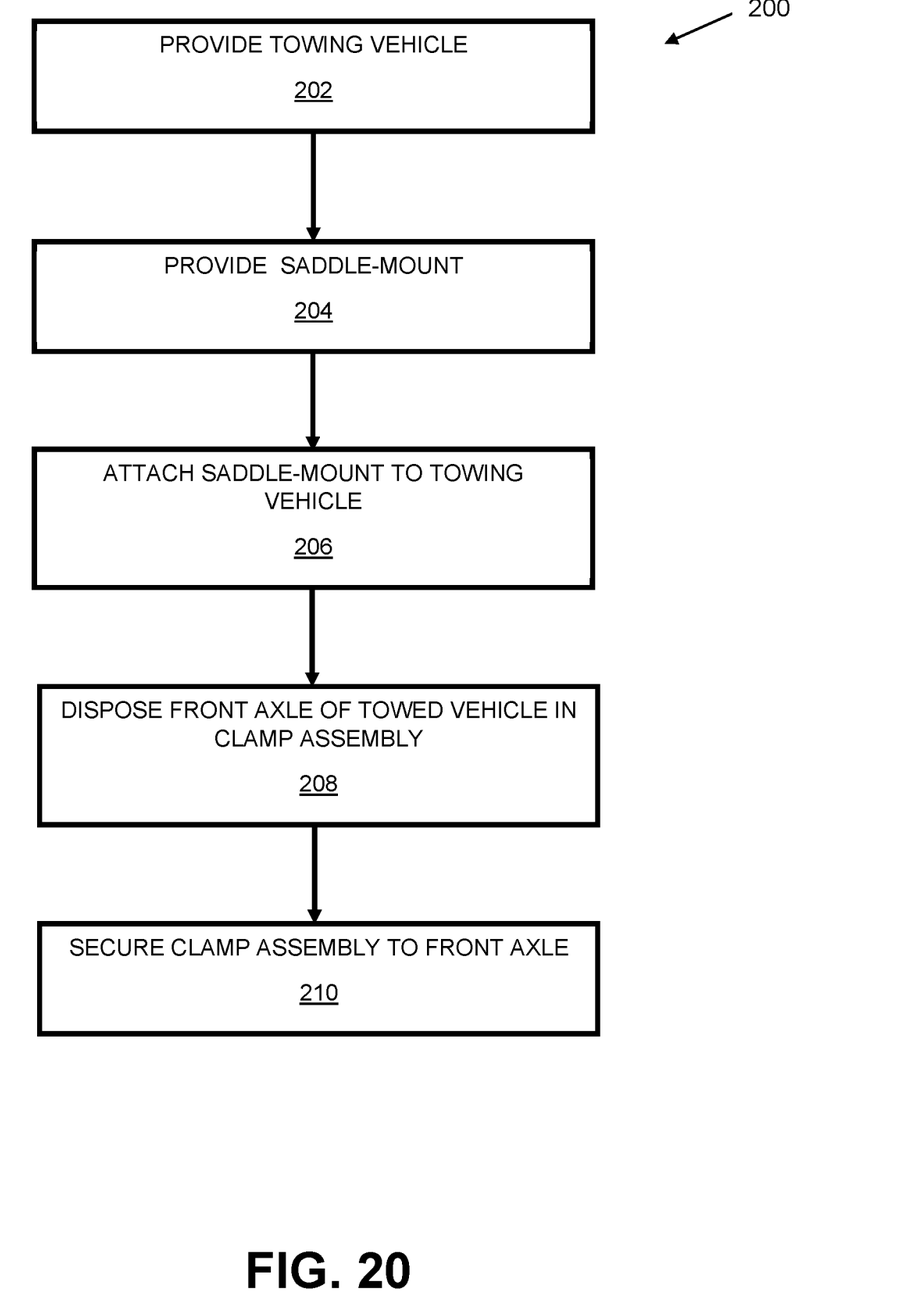
FIG. 20 is a flowchart illustrating the method of towing a vehicle of FIG. 19.

The present disclosure includes a method 200 for towing a vehicle with the saddle-mount 100, for example, as shown in FIGS. 19-20. A first step 202 in the method 200 may include providing the towing vehicle. A second step 204 in the method 200 may include providing the appropriate saddle-mount 100, as described in further detail hereinabove, based upon the vehicle to be towed. For example, specific bolsters 101 may be selected by a skilled artisan.

A third step 206 in the method 200 may be attaching the saddle-mount 100 to the towing vehicle. A fourth step 208 of the method 200 is disposing the axle of the vehicle to be towed into the clamp assembly 106. In particular, the straight bolt 112 may be loosened from the rocker body 114 and the J-clamp body 124. The J-clamp body 124 may slide away from the rocker body 114, and be rotated down to provide clearance for the axle. The axle may be disposed adjacent to the first hook portion 172 of the rocker body 114. The J-clamp body 124 may be rotated to face the rocker body 114, and then the J-clamp body 124 may be slid into the rocker body 114 until the axle is disposed adjacent to each of the first hook portion 172 and the second hook portion 174.

The method 200 has a fifth step 210 may be securing the clamp assembly 106. In particular, the straight bolt 112 may be rotated into the threaded segment 138 of the J-clamp body 124. The axle of the vehicle to be towed is thereby secured to the saddle-mount 100 and may be towed, as necessary.

Advantageously, the saddle-mount 100 of the present disclosure may accommodate axles of varying sizes. Further, the saddle-mount 100 provides a significantly larger amount of clamping force compared to the known saddle-mounts.

While certain representative embodiments and details have been shown for purposes of illustrating the invention, it will be apparent to those skilled in the art that various changes may be made without departing from the scope of the disclosure, which is further described in the following appended claims.

What is claimed is:

1. A saddle-mount, comprising:
   a bolster configured to be disposed on a towing vehicle; and
   a head assembly having a base disposed on the bolster, and at least one clamp assembly pivotably connected to the base and configured to connect to a vehicle to be towed, the clamp assembly having a J-clamp, a rocker, and a straight bolt, the J-clamp slidably disposed in the rocker and selectively secured to the rocker by the straight bolt, the straight bolt disposed through the rocker, whereby a position of the J-clamp relative to the rocker is controlled by a rotation of the straight bolt.

2. The saddle-mount of claim 1, wherein the rocker has a rocker body with a first bore having a first major interior surface.

3. The saddle-mount of claim 2, wherein the rocker has a channel formed in an upper surface of the rocker body and disposed adjacent to the first bore.

4. The saddle-mount of claim 3, wherein the J-clamp has a clamp body with a block portion and a hollow cylindrical portion, the J-clamp body having a second major interior surface defining a second bore disposed through the hollow cylindrical portion and at least part of the block portion, and the hollow cylindrical portion having a second major exterior surface.

5. The saddle-mount of claim 4, wherein the first bore of the rocker body has a first diameter and the hollow cylindrical portion of the J-clamp body has a second diameter, the first diameter being greater than the second diameter and permitting the hollow cylindrical portion of the J-clamp body to be slidably received by the first bore of the rocker body.

6. The saddle-mount of claim 4, wherein the channel of the rocker body has a first width and the block portion of the J-clamp body has a second width, the first width being greater than the second width and permitting the block portion of the J-clamp body to be slidably received by the channel of the rocker body.

7. The saddle-mount of claim 6, wherein the block portion of the J-clamp body is not permitted to rotate within the channel of the rocker body.

8. The saddle-mount of claim 4, wherein the second major interior surface of the cylindrical hollow portion of the J-clamp body has an unthreaded segment and a threaded segment, the threaded segment cooperating with the straight bolt to selectively secure the J-clamp to the rocker.

9. The saddle-mount of claim 8, wherein the unthreaded segment has a first length and the threaded segment has a second length, and the second length is less than the first length.

10. The saddle-mount of claim 7, wherein the block portion of the J-clamp body is slidably disposed in the channel of the rocker body, and the hollow cylindrical portion of the J-clamp body is slidably disposed in the first bore of the rocker body.

11. The saddle-mount of claim 10, wherein the rocker body has an opening formed in a first end of the rocker body, the opening in communication with the first bore.

12. The saddle-mount of claim 11 wherein the straight bolt is disposed through the opening at the first end of the rocker body, through the first bore of the rocker body, and in the second bore of the J-clamp body.

13. The saddle-mount of claim 4, wherein the rocker body further has a first hook portion, and the J-clamp body further has a second hook portion, the first hook portion disposed opposite and facing the second hook portion, and the first hook portion and the second hook portion are configured to receive an axle of the vehicle to be towed therebetween.

14. A saddle-mount, comprising:
a bolster configured to be disposed on a towing vehicle;
a ball disposed on the bolster; and
a head assembly having at least one clamp assembly configured to receive a vehicle to be towed, the head assembly having a socket formed in a bottom surface thereof, the ball disposed in the socket, whereby the head assembly is permitted to freely pivot in any direction about the ball.

15. The saddle-mount of claim 14, wherein the socket is disposed at an angle relative to the bolster.

16. The saddle-mount of claim 14, wherein the ball has an upper portion, an attachment portion, and a threaded bore, the upper portion is disposed in the head assembly and the attachment portion disposed on the bolster.

17. The saddle-mount of claim 16, wherein the upper portion of the ball is secured to the head assembly by a ball cap and at least one ball cap locking plate and the attachment portion is secured to the bolster with at least one ball cap locking plate.

18. The saddle-mount of claim 16, wherein a king pin is disposed in the ball and the bolster, thereby connecting the ball to the bolster.

19. The saddle-mount of claim 17, wherein the ball cap has one lubrication aperture disposed therein.

20. A saddle-mount, comprising:
a bolster configured to be disposed on a towing vehicle;
a ball disposed on the bolster; and
a head assembly having at least one clamp assembly configured to receive a vehicle to be towed, the head assembly having a socket formed in a bottom surface thereof, and the ball disposed in the socket, whereby the head assembly is permitted to freely pivot in any direction about the ball, the clamp assembly having a J-clamp, a rocker, and a straight bolt, the J-clamp slidably disposed in the rocker and selectively secured to the rocker by the straight bolt, the straight bolt disposed through the rocker and threaded with the J-clamp, whereby a position of the J-clamp relative to the rocker is controlled by a rotation of the straight bolt.

\* \* \* \* \*